United States Patent
Inai

(10) Patent No.: US 7,196,732 B2
(45) Date of Patent: Mar. 27, 2007

(54) TELEVISION BROADCAST RECEPTION DEVICE

(75) Inventor: Atsumi Inai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 433 days.

(21) Appl. No.: 10/500,376

(22) PCT Filed: Dec. 3, 2003

(86) PCT No.: PCT/JP03/15466

§ 371 (c)(1),
(2), (4) Date: Jun. 30, 2004

(87) PCT Pub. No.: WO2004/054248

PCT Pub. Date: Jun. 24, 2004

(65) Prior Publication Data

US 2005/0099542 A1    May 12, 2005

(30) Foreign Application Priority Data

Dec. 6, 2002    (JP) .............................. 2002-355140

(51) Int. Cl.
*H04N 5/46* (2006.01)
*H04N 5/50* (2006.01)

(52) U.S. Cl. ...................... 348/569; 348/555; 348/600; 348/570

(58) Field of Classification Search ................ 348/569, 348/555, 554, 570, 584, 589, 598, 600, 180, 348/185, 177; 345/630, 629; 455/423; 715/716
See application file for complete search history.

(56) References Cited

U.S. PATENT DOCUMENTS

| | | | | |
|---|---|---|---|---|
| 5,347,318 | A * | 9/1994 | Kobayashi et al. ......... | 348/556 |
| 5,448,307 | A * | 9/1995 | Gelissen et al. ............ | 348/584 |
| 5,461,428 | A * | 10/1995 | Yoo ........................... | 348/558 |
| 5,796,442 | A * | 8/1998 | Gove et al. ................. | 348/556 |
| 5,966,186 | A * | 10/1999 | Shigihara et al. ........... | 348/570 |
| 5,973,750 | A * | 10/1999 | Ogawa et al. .............. | 348/570 |
| 5,978,855 | A | 11/1999 | Metz et al. | |
| 5,991,832 | A * | 11/1999 | Sato et al. .................... | 710/33 |
| 6,005,629 | A * | 12/1999 | Douche et al. ........ | 375/240.26 |
| 6,226,047 | B1 | 5/2001 | Ryu | |
| 6,259,487 | B1 * | 7/2001 | Bril ............................. | 348/553 |

(Continued)

FOREIGN PATENT DOCUMENTS

JP    10-136274    5/1998

(Continued)

*Primary Examiner*—David Ometz
*Assistant Examiner*—Jean W. Désir
(74) *Attorney, Agent, or Firm*—Wenderoth, Lind & Ponack, L.L.P.

(57) ABSTRACT

Provided is a television broadcast receiver which is further enhanced in the independency of the user application software from the hardware and can increase the development efficiency. The television broadcast receiver includes; a digital channel-selecting means; an analog channel-selecting means; a video signal processing means for processing a video signal from the digital channel-selecting means and a video signal from the analog channel-selecting means; a graphics OSD creating means for creating a graphics OSD signal; a text OSD creating means for creating a text OSD signal; and an RGB processing means for mixing an output of the video signal processing means, the graphics OSD signal, and the text OSD signal.

3 Claims, 2 Drawing Sheets

U.S. PATENT DOCUMENTS

| | | | |
|---|---|---|---|
| 6,310,654 B1 * | 10/2001 | Oku et al. | 348/554 |
| 6,346,972 B1 * | 2/2002 | Kim | 348/569 |
| 6,351,292 B1 * | 2/2002 | Knox et al. | 348/569 |
| 6,369,858 B1 * | 4/2002 | Lee | 348/569 |
| 6,380,984 B1 * | 4/2002 | Inoue et al. | 348/569 |
| 6,388,715 B1 * | 5/2002 | Eggen et al. | 348/569 |
| 6,421,094 B1 * | 7/2002 | Han | 348/569 |
| 6,452,638 B1 * | 9/2002 | Oku et al. | 348/441 |
| 6,593,937 B2 * | 7/2003 | Ludtke et al. | 345/629 |
| 6,700,624 B2 * | 3/2004 | Yun | 348/555 |
| 6,710,817 B2 * | 3/2004 | Oku et al. | 348/569 |
| 6,714,254 B2 * | 3/2004 | Enomoto | 348/564 |
| 6,741,293 B1 * | 5/2004 | Obuchi | 348/554 |
| 7,061,542 B1 * | 6/2006 | Ikeguchi | 348/558 |
| 7,106,382 B2 * | 9/2006 | Shiotsu | 348/555 |
| 7,116,377 B2 * | 10/2006 | Zeidler et al. | 348/569 |
| 2002/0027609 A1 | 3/2002 | Oku et al. | |

FOREIGN PATENT DOCUMENTS

| | | |
|---|---|---|
| JP | 10-341386 | 12/1998 |
| JP | 2002-077958 | 3/2002 |
| JP | 2002-232795 | 8/2002 |
| KR | 1998-085978 | 12/1998 |

* cited by examiner

TELEVISION BROADCAST RECEPTION DEVICE

TECHNICAL FIELD

The present invention relates to a television broadcast receiver capable of receiving a digital broadcast, and more specifically the invention relates to a television broadcast receiver incorporating a digital broadcast receiving function.

BACKGROUND ART

In regard to a control device of a conventional television broadcast receiver, a method for shortening a development period, during which a plurality of television broadcast receivers different in specifications are developed for a short period, is as follows. That is, the method includes to provide a control device of a television broadcast receiver with an application microprocessor serving to control all aspects of display and an additional function and a functional microprocessor depending on the hardware of a receiver, thereby, to make the hardware managed by the functional microprocessor transparent to the application microprocessor. Therefore, there are known methods for preventing the occurrence of a failure depending on the hardware of a receiver and shortening the development period. One of the methods is disclosed in, for example, Japanese Laid-Open Patent No. H10-136274.

However, in the above conventional control device, the functional microprocessor has no display means. As a result, the application microprocessor also control OSD display which depends on hardware designed for adjustments in a factory, in a market, etc., and thus the application microprocessor have a hardware-dependent portion, which poses a problem such that the control device is inadequate in its independency.

DISCLOSURE OF THE INVENTION

A television broadcast receiver, includes:

a digital channel-selecting means for receiving a digital broadcast;

an analog channel-selecting means for receiving an analog broadcast;

a video signal processing means for processing a video signal from the digital channel-selecting means and a video signal from the analog channel-selecting means;

a graphics OSD creating means for creating a graphics OSD signal;

a text OSD creating means for creating a text OSD signal; and an RGB processing means for mixing an output of the video signal processing means, the graphics OSD signal, and the text OSD signal, wherein the graphics OSD creating means follows the digital channel-selecting means, the graphics OSD creating means is independent as a digital broadcast receiving and user application module, and the text OSD creating means isolates an adjusting application depending on the hardware of the digital broadcast receiver from the hardware of the digital broadcast receiver together with the analog channel-selecting means and video signal processing means.

DETAILED DESCRIPTION OF THE PREFERRED EMBODIMENTS

The invention was devised in consideration of the foregoing circumstance, and therefore it is an object of the invention to provide a television broadcast receiver which can be enhanced in the independency of its user application software from the hardware thereby to raise the development efficiency.

Figure 1:
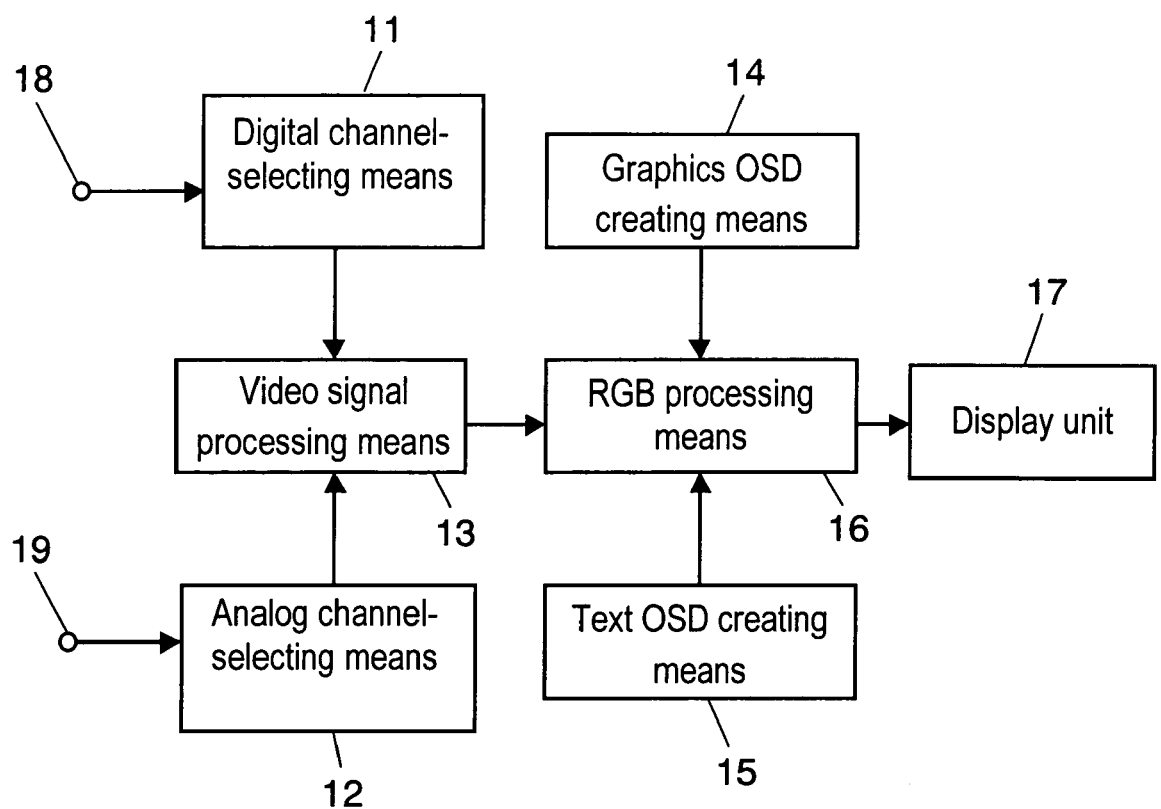
FIG. 1 is a block diagram showing the configuration of a television broadcast receiver according to an embodiment of the invention.

FIG. 1 is a block diagram showing the configuration of a television broadcast receiver according to an embodiment of the invention. The configuration of the television broadcast receiver will be described below in reference to FIG. 1.

Television broadcast high frequency signals from an antenna, a cable, or the like are entered into digital channel-selecting means 11 through input terminal 18. Digital channel-selecting means 11 carries out the processes, such as channel selecting, demodulation, and decoding, on the high frequency signals to output video signals, sound signals, etc. In contrast, analog broadcast high frequency signals from the antenna, the cable, or the like are entered into analog channel-selecting means 12 through input terminal 19. Analog channel-selecting means 12 carries out the processes, such as channel selecting, and demodulation, on the high frequency signals to output video signals, sound signals, etc. video signal processing means 13 carries out the processes, such as switching, mixing, and other processing, on video signals from digital channel-selecting means 11 and video signals from analog channel-selecting means 12 to output video signals. Graphics OSD creating means 14 creates and outputs graphics OSD signals. Graphics OSD signals are on-screen display signals including a graphical image. Text OSD creating means 15 creates and outputs text OSD signals. Text OSD signals are on-screen display signals primarily composed of texts. RGB processing means 16 mixes outputs of video signal processing means 13, graphics OSD signals from graphics OSD creating means 14, and text OSD signals from text OSD creating means 15. Display unit 17 receives and displays outputs of RGB processing means 16. Graphics OSD creating means 14 operates following digital channel-selecting means 11 and is independent as a digital broadcast receiving and user application software module. In contrast, text OSD creating means 15 isolates an adjusting application depending on the hardware of the television broadcast receiver from the digital broadcast receiver together with analog channel-selecting means 12 and video signal processing means 13.

Figure 2:
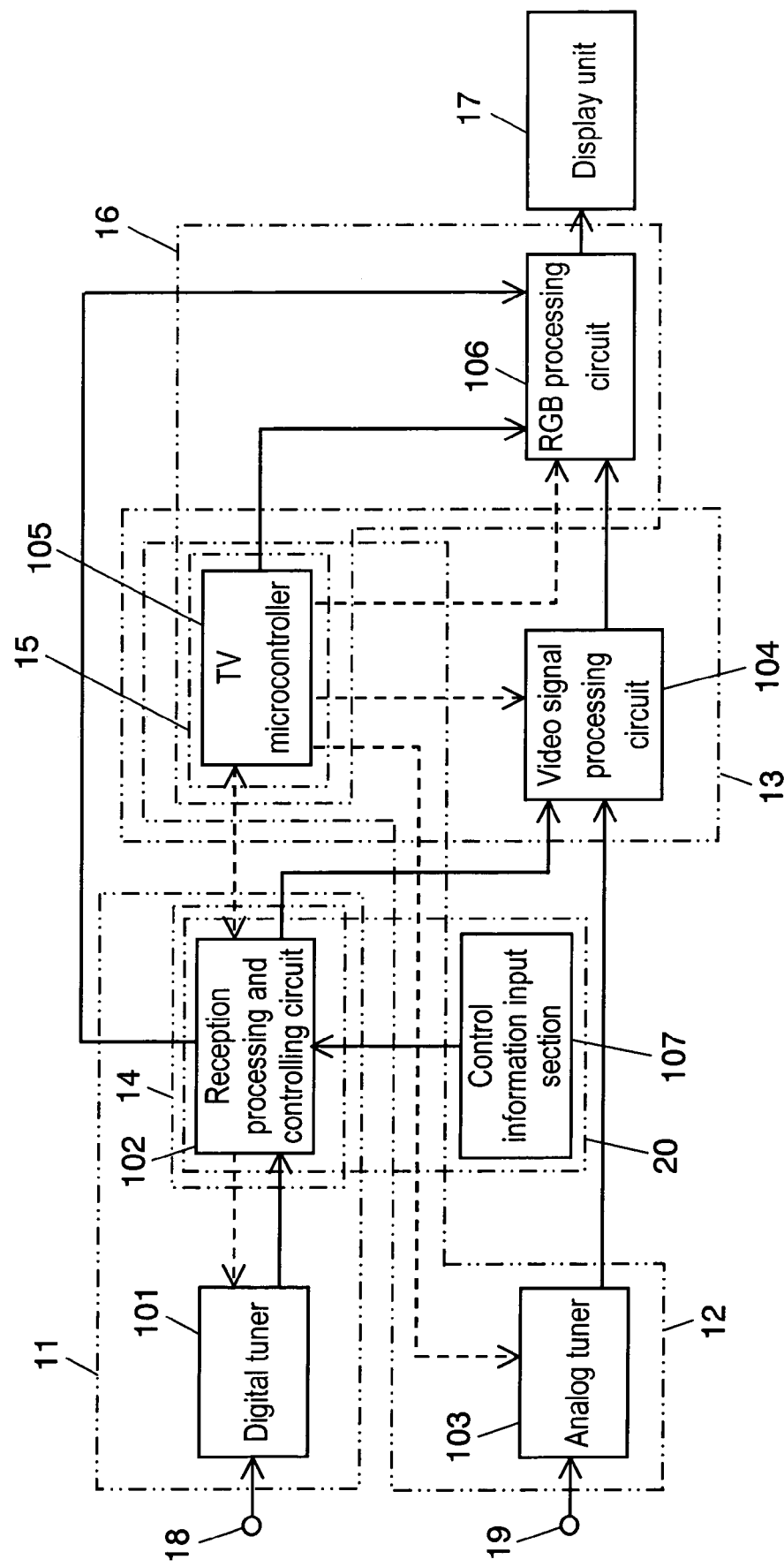
FIG. 2 is a block diagram showing more concretely the configuration of the television broadcast receiver according to the embodiment of the invention.

Next, the configuration of the television broadcast receiver according to the embodiment of the invention will be described further in detail in reference to FIG. 2. FIG. 2 is a block diagram further concretely showing the configuration of the television broadcast receiver according to the embodiment of the invention.

In FIG. 2, the digital channel-selecting means 11, analog channel-selecting means 12, video signal processing means 13, graphics OSD creating means 14, text OSD creating means 15, RGB processing means 16, display unit 17, input terminal 18, and input terminal 19 are the same as portions labeled with the same numerals in FIG. 1. The detailed descriptions of those are omitted.

Incidentally, digital tuner 101 and reception processing and controlling circuit 102 constitute digital channel-selecting means 11; reception processing and controlling circuit 102 constitutes graphics OSD creating means 14; analog tuner 103 and TV microcontroller 105 constitute analog channel-selecting means 12; video signal processing circuit 104 and TV microcontroller 105 constitute video signal processing means 13; RGB processing circuit 106 and TV microcontroller 105 constitute RGB processing means 16; and TV microcontroller 105 constitutes text OSD creating means 15.

Digital broadcast high frequency signals from the antenna, the cable, or the like are entered into digital tuner 101 through input terminal 18. Digital tuner 101 receives the digital broadcast high frequency signals and carries out given processes on the signals to output a transport stream (hereinafter referred to as TS). The processes carried out in the digital tuner 101 include: selecting a channel for desired signals among the input high frequency signals; demodulating signals of the selected channel (channel-decode); decoding the data resulting from the demodulation for error correction; and restoring TS. Based on TS output from digital tuner 101, reception processing and controlling circuit 102 creates video signals, controls digital tuner 101, and creates graphics OSD (on-screen display) signals. In general, TS undergoes TS-decoding to create a video stream, a sound stream, etc.; and the video stream and sound stream undergo AV-decoding to create video signals and sound signals. The graphics OSD created by reception processing and controlling circuit 102 refers to the graphics OSD created by graphics OSD creating means 14 in FIG. 1. The reception processing and controlling circuit 102 may be composed of one chip LSI.

In contrast, analog broadcast high frequency signals from the antenna, the cable, or the like are supplied to analog tuner 103 through input terminal 19. Analog tuner 103 carries out the given processes on the analog broadcast high frequency signals supplied to input terminal 19 and restores video signals. The processes carried out by analog tuner 103 include: selecting a channel for desired signals among the input high frequency signals; and carrying out AM demodulation and FM demodulation on the signals selected for the channel. The video signals restored according to the demodulations are output to video signal processing circuit 104 in the subsequent stage. Video signal processing circuit 104 processes video signals from analog tuner 103 and video signals from reception processing and controlling circuit 102 to output video RGB signals. The processes executed by video signal processing circuit 104 include: switching two kinds of video signals input therein; mixing them; and making various adjustments for picture quality. In general, video signals from the analog tuner 103 are composite video signals in many cases, and the conversion of composite video signals into RGB video signals is also executed by video signal processing circuit 104. RGB processing circuit 106 mixes video RGB signals from video signal processing circuit 104, an RGB signal format graphics OSD output from reception processing and controlling circuit 102, and an RGB signal format text OSD output from TV microcontroller 105 thereby to output the resultant signals to display unit 17. The processes for the mixing executed by RGB processing circuit 106 include: switching between input signals; fitting and superimposition of a picture plane; and image processing.

TV microcontroller 105 is a TV microcontroller for creating a text OSD and controlling analog tuner 103, video signal processing circuit 104, and RGB processing circuit 106. The text OSD refers to a text OSD created by text OSD creating means 15 in FIG. 1. The text OSD signal is an on-screen display signal primarily composed of texts.

The operations of the television broadcast receiver configured as described above will be described here.

First of all, the operation in a normal working condition will be described. Reception processing and controlling circuit 102 carries out the processes, such as AV decoding on TS and concurrently receives the user control information by a remote control unit, etc. The user control information of the remote control unit, etc. is entered into control information input section 107, and control information input section 107 enters signals corresponding to the information into reception processing and controlling circuit 102. Reception processing and controlling circuit 102 issues instructions on various types of control operations to TV microcontroller 105 with inter-microprocessor communication commands based on the entered user control information on a remote control unit, etc. As for the OSD (on-screen display) which is visible for all users in a normal working condition, reception processing and controlling circuit 102 creates RGB signals of a graphics OSD using a graphics creating section (not shown) incorporated therein in order to graphically display, first. Then, RGB processing circuit 106 in the subsequent stage superimposes the graphics OSD on the video signals and mixes them. The graphics OSD is thus displayed.

Here, TV microcontroller 105 receives the command instructions from reception processing and controlling circuit 102 and controls analog tuner 103 to select a channel, and controls video processing circuit 104 and RGB controlling circuit 106 thereby to make user adjustments of a picture. In a normal working condition no text OSD is output. In other words, in a normal working condition a text OSD isn't displayed on display unit 17.

Now, the operations in an in-factory-adjusted mode and an in-market-adjusted-by-serviceperson mode will be described. The in-factory-adjusted mode, in-market-adjusted-by-serviceperson mode, and the like are modes which are pronouncedly dependent on device models and noticeably hardware-dependent. When reception processing and controlling circuit 102 executes OSD display in the modes, the device-model dependence of the software is increased and thus the hardware-related specifications follows the user application software specifications. As a result, the ability of the user application software to be expanded as a module is made worse. Therefore, when the device will be brought into the in-factory-adjusted mode or the in-market-adjusted-by-serviceperson mode, reception processing and controlling circuit 102 sends an instruction about that to TV microcontroller 105 by command communication. According to the instruction, the OSD display will be switched to a text OSD created by TV microcontroller 105. The OSD in the cases of the in-factory-adjusted mode, the in-market-adjusted-by-serviceperson mode, and the like is invisible for users and as such, the OSD may be not necessarily graphical and therefore it may be a reasonable characters-based text OSD held down in costs, as shown in the embodiment.

In addition, reception processing and controlling circuit 102 and control information input section 107 constitute input processing means 20. It has already described that control information input section 107 accepts control information according to user control on the remote control unit to carry out the given processes. Control information input section 107 accepts control information treated by a developer in addition to control information according to user control on the remote control unit. The control information that a developer treats is not used by a common user and it is a piece of control information commonly unable to be known by a user. The control information that a developer treats can be entered, for example, by pressing keys on the remote control unit in a predetermined order or pressing predetermined keys for a predetermined length of time or at predetermined time intervals. Also, the control information that a developer treats can be entered by controlling a predetermined switch in the broadcast receiver. Based on the control information that a developer treats, which has been entered in this manner, control information input section 107 supplies reception processing and controlling circuit 102 with signals corresponding to the information. When a developer performs certain key entries in this manner, TV microcontroller 105 can be caused to execute OSD display as a user application software in relation to analog channel selection.

The above description cites the control information that a developer treats as the control information which is not used by a common user and commonly unable to be known by a user. The control information which is not used by a common user and commonly unable to be known by a user is not limited to the control information that a developer treats and it may be the control information used in a production step in a factory or in a step of adjustment by a serviceperson in a market as already described. The control information that a developer treats, the control information used in a production step in a factory, and the control information used in a step of adjustment by a serviceperson in a market are be generically referred to as manufacturer's control information.

Now, as already described, TV microcontroller 105 and reception processing and controlling circuit 102 are connected by inter-microprocessor communication which allows information to be sent or received bidirectionally. Therefore, it is also possible for TV microcontroller 105 to procure the information on an operation condition and a trouble in reception processing and controlling circuit 102. On the other hand, TV microcontroller 105 is also connected with analog tuner 103, video signal processing circuit 104, and RGB processing circuit 106 by communication which allows information to be sent or received bidirectionally. Accordingly, TV microcontroller 105 can procure the information on the operation conditions and a trouble in these sections and control the specifications for operations in these sections. From such back ground, it is possible to arrange TV microcontroller 105 as an anomaly-sensing means for sensing an operation anomaly of an independent digital broadcast receiving and user application module. Thus, when the user application module falls into an operation anomaly, it is possible to cause TV microcontroller 105 to perform text OSD display.

As described above, the television broadcast receiver of the invention can cause the graphics OSD creating means to follow the digital channel-selecting means and make them independent as a digital broadcast receiving and user application module. In addition, the receiver-dependent adjusting application can be kept isolated with the analog channel-selecting means and the video signal processing circuit in the television broadcast receiver by the text OSD creating means. This can raise the development efficiency in expanding the device model.

In addition, in the television broadcast receiver of the invention, a developer performs given key entries or the like from the input processing means, whereby the text OSD creating means can execute OSD display as a user application software involved in analog channel selection. This can serve facilities in the development.

Further, the television broadcast receiver of the invention may include an anomaly-sensing mean for sensing an operation anomaly of an independent digital broadcast receiving and user application module. Thus, the operation of an application involved in analog channel selection can be ensured by the text OSD display means in the case where the user application module falls into an operation anomaly.

INDUSTRIAL APPLICABILITY

A television broadcast receiver according to the invention can serve facilities in the development and raise the development efficiency in expanding the device model. Further, the television broadcast receiver according to the invention can ensure the operation of the application even when the user application software module falls into an operation anomaly.

The invention claimed is:

1. A television broadcast receiver, comprising:
   a digital channel-selecting means for receiving a digital broadcast;
   an analog channel-selecting means for receiving an analog broadcast;
   a video signal processing means for processing a video signal from the digital channel-selecting means and a video signal from the analog channel-selecting means;
   a graphics OSD creating means for creating a graphics OSD signal;
   a text OSD creating means for creating a text OSD signal; and
   an RGB processing means for mixing an output of the video signal processing means, the graphics OSD signal, and the text OSD signal,
   wherein the graphics OSD creating means follows the digital channel-selecting means,
   the graphics OSD creating means is independent as a digital broadcast receiving and user application module, and
   the text OSD creating means isolates an adjusting application depending on the hardware of the digital broadcast receiver from the hardware of the digital broadcast receiver together with the analog channel-selecting means and the video signal processing means.

2. The television broadcast receiver of claim 1, further comprising an input processing means for processing manufacturer's control information,
   wherein the input processing means controls the text OSD creating means based on the manufacturer's control information so that the text OSD creating means creates OSD signals as a user application software in regard to the channel selection of the analog broadcast.

3. The television broadcast receiver of claim 1, further comprising an anomaly-sensing mean for sensing an operation anomaly on at least one of the digital broadcast receiver and the user application module,
   wherein the anomaly-sensing mean controls the text OSD creating means so that the text OSD creating means creates signals for displaying an operation anomaly when the anomaly-sensing mean senses the operation anomaly.

* * * * *